United States Patent
Freeman et al.

[15] 3,670,077
[45] June 13, 1972

[54] FUNGICIDAL AND INSECTICIDAL METHODS AND COMPOSITIONS EMPLOYING PYRIMIDINE DERIVATIVES

[72] Inventors: Peter Frank Hilary Freeman; Margaret Claire Shephard; Brian Kenneth Snell, all of Bracknell, England

[73] Assignee: Imperial Chemical Industries Limited, London, England

[22] Filed: June 3, 1968

[21] Appl. No.: 733,770

[30] Foreign Application Priority Data

June 14, 1967 Great Britain.....................27,482/67

[52] U.S. Cl..........................424/200, 260/256.4, 424/248, 424/251
[51] Int. Cl.........................................A01n 9/36, A01n 9/22
[58] Field of Search.................................424/200, 248, 251; 260/256.4 N

[56] References Cited

UNITED STATES PATENTS

| | | | |
|---|---|---|---|
| 2,832,782 | 4/1958 | Alberi | 260/256.4 |
| 2,994,637 | 8/1961 | Bimber | 260/256.4 X |
| 3,045,016 | 7/1962 | Miller et al. | 260/256.4 |
| 3,287,453 | 11/1966 | McHattie | 260/256.5 |

*Primary Examiner*—Albert T. Meyers
*Assistant Examiner*—Doris J. Funderburk
*Attorney*—Cushman, Darby & Cushman

[57] ABSTRACT

Fungicidal and insecticidal pyrimidine derivatives of the formula

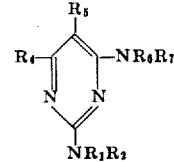

and salts thereof. The $R_1 - R_7$ substituents may all be hydrogen or various organic radicals.

6 Claims, No Drawings

FUNGICIDAL AND INSECTICIDAL METHODS AND COMPOSITIONS EMPLOYING PYRIMIDINE DERIVATIVES

This invention relates to new pyrimidine derivatives, to processes for preparing them, to pesticidal compositions and especially fungicidal compositions containing them and to methods of combating pests.

Accordingly the present invention provides novel pyrimidine derivatives of the formula:

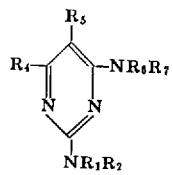

or salts thereof, wherein:

$R_1$ and $R_2$ are atoms of hydrogen or represent organic radicals or together with the adjacent nitrogen atom represent heterocyclic radicals;

$R_4$ and $R_5$ are atoms of hydrogen or represent organic radicals;

$R_6$ and $R_7$ are atoms of hydrogen or represent organic radicals or together with the adjacent nitrogen atom represent a heterocyclic radical, or;

$R_6$ is an atom of hydrogen or an organic radical and $R_7$ is an hydroxyl or amino group.

When $R_1$ and $R_2$ represent organic radicals they are preferably alkyl or carboxyalkyl radicals or amino groups, and when $R_4$ is an organic radical it is preferably an alkyl radical. Further, $R_5$ is preferably a hydrogen atom, an alkyl group or an alkenyl group. $R_6$ is preferably an atom of hydrogen. $R_7$ may be either an hydroxy or an amino group, or an aryl radical; or a group —N  $CR_8$—$R_9$ wherein $R_9$ is an aryl, heterocylic phosphoryl or thiophosphoryl radical and $R_8$ is an atom of hydrogen or an alkyl group, or where $R_8$ and $R_9$ together with the adjacent carbon atom represent a cyclic group or a group —NH—$R_{10}$ where $R_{10}$ is a phosphoryl, thiophosphoryl, carbonyl, thiocarbonyl or sulphonyl group bearing an amino group or an alkyl, alkoxy or aryl radical.

and the various substituent groups $NR_1R_2$, $R_4$, $R_5$ and $R_7$ are set out in columns under corresponding headings. The physical characteristics for each particular compound are also recited, the figure given being, unless otherwise stated, the melting point (m.p.) expressed in degrees centigrade.

When $R_1$ and $R_2$ and/or $R_6$ and $R_7$ together with the adjacent nitrogen atom represent a heterocyclic group or groups, preferred such groups include five and six membered rings, for example piperidine or morpholine rings.

In a preferred aspect therefore the invention provides novel pyrimidine derivatives of the formula:

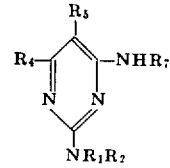

and salts thereof, wherein $R_1$ and $R_2$ represent alkyl or carboxyalkyl radicals or amino groups; $R_4$ is an alkyl radical; $R_5$ is hydrogen or an alkyl or alkenyl radical; and $R_7$ is either (i) a hydroxy or amino group or an aryl radical or (ii) a group —N  $CR_8$—$R_9$ wherein $R_8$ is hydrogen or alkyl and $R_9$ is an aryl, phosphoryl, or thiophosphoryl radical or $R_8$ and $R_9$ together with the adjacent carbon atom represent a cyclic group or (iii) a group —NH—$R_{10}$ wherein $R_{10}$ is phosphoryl, thiophosphoryl, carbonyl, thiocarbonyl or sulphonyl group bearing an amino group or an alkyl, alkoxy or aryl radical.

Particularly useful pyrimidine derivatives are listed in Table I hereafter. The compounds set out in Table I correspond to the general formula:

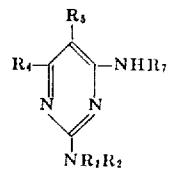

TABLE I

| Compound Number | $NR_1R_2$ | $R_4$ | $R_5$ | $R_7$ | Physical characteristics |
|---|---|---|---|---|---|
| 1 | $N(CH_3)_2$ | $CH_3$ | $nC_4H_9$ | —⟨⟩—$CH_3$ | 76° |
| 2 | $N(CH_3)_2$ | $CH_3$ | $nC_4H_9$ | $NH_2$ | 100° |
| 3 | $N(CH_3)_2$ | $CH_3$ | $nC_3H_7$ | $NH_2$ | 122° |
| 4 | $N(CH_3)_2$ | $CH_3$ | $iC_5H_{11}$ | $NH_2$ | 127–128° |
| 5 | $N(CH_3)_2$ | $CH_3$ | —$CH_2CH=CH_2$ | $NH_2$ | 87–88° |
| 6 | $N(CH_3)_2$ | $CH_3$ | $nC_5H_{11}$ | $NH_2$ | 95–98° |
| 7 | $NHC_2H_5$ | $CH_3$ | $nC_4H_9$ | $NH_2$ | 119–120° |
| 8 | $N(CH_3)_2$ | $CH_3$ | $C_2H_5$ | $NH_2$ | 114° |
| 9 | $NHC_3H_7$ | $CH_3$ | $nC_4H_9$ | $NH_2$ | 132–134° |
| 10 | $N(CH_3)_2$ | $CH_3$ | H | $NH_2$ | 105–106° |
| 11 | $N(CH_3)_2$ | $CH_3$ | $nC_3H_7$ | —N=CH—⟨⟩ | 103–104° |
| 12 | $N(CH_3)_2$ | $CH_3$ | $nC_4H_9$ | —N=CH—⟨⟩ | 89° |
| 13 | $N(CH_3)_2$ | $CH_3$ | $nC_4H_9$ | —N=CH—⟨⟩—$CH_3$ | 100–101° |
| 14 | $N(CH_3)_2$ | $CH_3$ | $nC_4H_9$ | —N=CH—⟨⟩—Cl | 113–115° |
| 15 | $N(CH_3)_2$ | $CH_3$ | $nC_4H_9$ | —N=CH—⟨⟩ with OH | 146–148° |

Table 1—Continued

| Compound Number | $NR_1R_2$ | $R_4$ | $R_5$ | $R_7$ | Physical characteristics |
|---|---|---|---|---|---|
| 16 | $N(CH_3)_2$ | $CH_3$ | $nC_4H_9$ | $-N=CH-\underset{O}{\underset{|}{\bigcirc}}-NO_2$ (furan) | 113° |
| 17 | $N(CH_3)_2$ | $CH_3$ | $nC_4H_9$ | $-N=CH-C_6H_3Cl_2$ (2,4-diCl) | 98° |
| 18 | $N(CH_3)_2$ | $CH_3$ | $nC_4H_9$ | $-N=CH-C_6H_4-OCH_3$ | 82° |
| 19 | $N(CH_3)_2$ | $CH_3$ | $nC_4H_9$ | $-N=CH-C_6H_3Cl_2$ (3,4-diCl) | 108° |
| 20 | $N(CH_3)_2$ | $CH_3$ | H | $-N=CH-C_6H_4-CH_3$ | 190° |
| 21 | $N(CH_3)_2$ | $CH_3$ | H | $-N=CH-C_6H_4-Cl$ | 188° |
| 22 | $N(CH_3)_2$ | $nC_6H_{13}$ | H | $-N=CH-C_6H_4-CH_3$ | 103° |
| 23 | $N(CH_3)_2$ | $nC_6H_{13}$ | H | $-N=CH-C_6H_4-Cl$ | 109° |
| 24 | $N(CH_3)_2$ | $CH_3$ | $nC_3H_7$ | $-NH_3^+CNS^-$ | 148–150° |
| 25 | $N(CH_3)_2$ | $CH_3$ | $nC_3H_7$ | $-NH-CSNH_2$ | 209–210° |
| 26 | $N(CH_3)_2$ | $CH_3$ | $nC_3H_7$ | $-NH-CONH_2$ | 202–203° |
| 27 | $N(CH_3)_2$ | $CH_3$ | $nC_3H_7$ | $-NH-SO_2-C_6H_5$ | 146–147° |
| 28 | $N(CH_3)_2$ | $CH_3$ | $nC_4H_9$ | $-NH-CO-C_6H_5$ | 138–140° |
| 29 | $N(CH_3)_2$ | $CH_3$ | $nC_4H_9$ | $-NH-CO\cdot OC_2H_5$ | 93–95° |
| 30 | $N(CH_3)_2$ | $CH_3$ | $nC_4H_9$ | $-NH\cdot CO-C_6H_4-Cl$ | 149–150° |
| 31 | $N(CH_3)_2$ | $CH_3$ | $nC_4H_9$ | $-NH\cdot SO_2-C_6H_5$ | 157–159° |
| 32 | $N(CH_3)_2$ | $CH_3$ | $nC_4H_9$ | $-NH\cdot CO\cdot C_5H_{11}n$ | 129–130° |
| 33 | $N(CH_3)_2$ | $CH_3$ | $nC_4H_9$ | $-NH-\overset{O}{\underset{\|}{P}}(OC_2H_5)_2$ | 87° |
| 34 | $N(CH_3)_2$ | $CH_3$ | $nC_4H_9$ | $-N=\overset{CH_3}{\underset{\|}{C}}-\overset{O}{\underset{\|}{P}}(OC_2H_5)_2$ | (¹) |
| 35 | $N(CH_3)_2$ | $CH_3$ | $nC_3H_7$ | OH | $n_D^{26}=1.5310$; 97–98° |
| 36 | $N(CH_3)_2$ | $CH_3$ | $nC_4H_9$ | OH | 87–89° |
| 37 | $N(CH_3)_2$ | $CH_3$ | $nC_4H_9$ | $-N=CH-C(\text{isoxazolone-phenyl})$ | 239° |
| 38 | $N(CH_3)_2$ | $CH_3$ | $nC_4H_9$ | $-N=CH-C(\text{isoxazolone-CH}_3)$ | 226–227° |
| 39 | $N(CH_3)_2$ | $CH_3$ | $nC_4H_9$ | $-N=\overset{CH_3}{\underset{\|}{C}}-\overset{CH_3}{\underset{\|}{C}}=N-NH-\text{pyrimidinyl}[nC_4H_9, CH_3, N(CH_3)_2]$ | 174–175° |

Table I—Continued

| Compound Number | NR₁R₂ | R₄ | R₅ | R₇ | Physical characteristics |
|---|---|---|---|---|---|
| 40 | N(CH₃)₂ | CH₃ | nC₄H₉ | 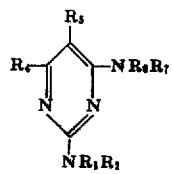—NH·CO·CO·NH·NH— | 258–260° |
| 41 | N(CH₃)₂ | CH₃ | nC₄H₉ | —N=CH·CH₂CH₂CH₃ | (¹) nD²³ 1.5570 |

¹ Undistillable oil.

Further particularly useful pyrimidine derivatives are set out in Table II below. These compounds all correspond to the general formula:

TABLE II

| Compound number | NR₁R₂ | R₄ | R₅ | NR₆R₇ | Physical characteristics |
|---|---|---|---|---|---|
| 42 | N(CH₃)₂ | CH₃ | nC₄H₉ | (morpholino N—O ring) | B.P. 120°/0.15 mm. nD²⁴=1.5380. |
| 43 | N(CH₃)₂ | CH₃ | nC₃H₇ | —N⟨N=C—CH₃ / C—C=N—NH—C₆H₅⟩ ‖O | M.P. 108–109°. |
| 44 | N(CH₃)₂ | CH₃ | nC₃H₇ | —N⟨N=C—CH₃ / C—C=N—NH—C₆H₃(CH₃)₂⟩ ‖O | M.P. 130°. |
| 45 | N(CH₃)₂ | CH₃ | nC₄H₉ | NH₂ | M.P. 58–59°. |

In this specification the numbering of the pyrimidine ring is as follows:

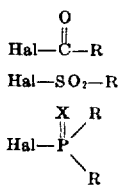

It may be noted that the 4- and 6- positions are equivalent.

The compounds of this invention can be obtained by a number of different methods and insofar as these methods are used to prepare them they are considered as constituting further aspects of the invention.

In the first of these methods the corresponding 6-halopyrimidine, preferably a 6-chloro- compound, is allowed to react with an excess of the appropriate amine. This reaction can be represented by the following equation:

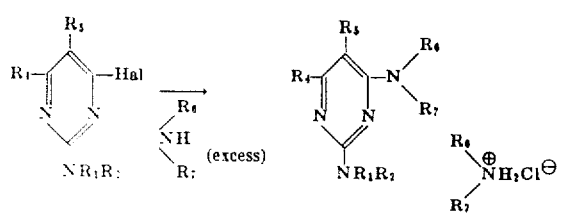

The preparation of 6-hydroxylamino pyrimidines involves the use of hydroxylamine hydrochloride in an acid catalysed displacement as follows:

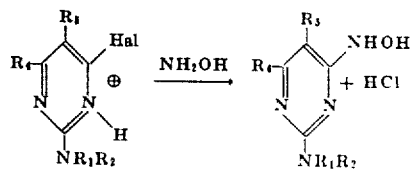

To obtain 6-hydrazinopyrimidines, hydrazine hydrate is used as the amine. Derivatives of these hydrazinopyrimidines may be obtained by acylation with an appropriate acid chloride, for example compounds represented by the formula:

$$Hal-\overset{O}{\underset{\|}{C}}-R$$

$$Hal-SO_2-R$$

$$Hal-\overset{X}{\underset{\|}{P}}\diagup{R}\diagdown{R}$$

where X is oxygen or sulphur and R is alkyl, alkoxy or aryl, for example. Conversely, a 6-halopyrimidine may be allowed to react with an acylated hydrazine derivative, for example NH₂·NH₂·C₆H₅ to form the acylated hydrazinopyrimidine directly. A 6-hydrazino pyrimidine can be condensed with the appropriate aldehyde or ketone to form, with the elimination of water, the corresponding anil. The reaction of a 6-hydrazinopyrimidine with potassium thiocyanate in HCl gives a thiocyanate salt of the 6-hydrazinopyrimidine, and other salts, e.g. hydrohalides, of the pyrimidine derivatives of this invention may be obtained by using processes well known in the art for this purpose. In order to obtain a 6-semicarbazidopyrimidine the corresponding 6-hydrazinopyrimidine is allowed to react with sodium cyanate in the presence of mineral acid.

The invention is illustrated by the following examples:

EXAMPLE 1

5-allyl-4-chloro-2-dimethylamino-6-methylpyrimidine (4.2 g.) and hydrazine hydrate (2 g.) were heated under reflux in cellosolve (ethylene glycol monoethyl ether (10 mls.) for 4 hours. The Cellosolve was removed by distillation and the residue recrystallized from petroleum ether (60–80°) to yield 5-allyl-2-dimethylamino-4-hydrazino-6-methylpyrimidine (Compound No. 5 of Table I). Compound Nos. 2–4 and 6–10, 35 and 36 of Table I were prepared by a similar method. In the case of Compound Nos. 35 and 36, hydroxylamine hydrochloride was used instead of hydrazine hydrate.

EXAMPLE 2

2-Dimethylamino-4-hydrazino-6-methyl-5-propyl-pyrimidine (3.1 g.) and benzaldehyde (2.1 g.) were heated under reflux together in benzene (25 mls.) for 5 hours. The benzene was then removed by distillation and the residue recrystallized from ethanol to yield 4-benzylidenehydrazino-2-dimethylamino-6-methyl-5-propylpyrimidine, (Compound No. 11 of Table I). Compound Nos. 38, 39 and 41 of Table I were similarly prepared.

EXAMPLE 3

5-Butyl-2-dimethylamino-4-hydrazino-6-methylpyrimidine (3.3 g.) and p-tolualdehyde (1.8 g.) were heated under reflux together for 1 hour in glacial acetic acid (20 mls.). The mixture was then diluted with water, neutralized with aqueous ammonia and the solid which formed recrystallized from ethanol to yield 5-butyl-2-dimethylamino-6-methyl-4-(4-methylbenzylidenehydrazino) pyrimidine (Compound No. 13 of Table I). Compound Nos. 12, 14–23, 37, 43 and 44 of Table I were prepared by a similar method using in each case the appropriate reactants.

EXAMPLE 4

2-Dimethylamino-4-hydrazino-6-methyl-5-propyl-pyrimidine (3.3 g.) was suspended in 15 mls. of water, and 2N aqueous hydrochloric acid (8 mls.) added, followed by sodium cyanate (1.0 g.) suspended in 5 mls. water. The mixture was heated on the steam bath for 1 hour, and then cooled, and the solid obtained was recrystallized from ethanol to give 2-dimethylamino-4-methyl-5-propyl-6-semicarbazidopyrimidine (Compound No. 26 of Table I). Compound No. 24 of Table I was similarly prepared.

EXAMPLE 5

The thiocyanate salt of 2-dimethylamino-4-hydrazino-6-methyl-5-propylpyrimidine was heated in an oil bath at 150°–160° C. for 1 hour. The salt melted and then resolidified. It was recrystallized from ethanol to yield 2-dimethylamino-6-methyl-5-propyl-4-thiosemicarbazidopyrimidine (Compound No. 25 of Table I).

EXAMPLE 6

Benzenesulphonylchloride (1.76 g.) and triethylamine (1g.) in water (10 mls.) were mixed and 2-dimethylamino-4-hydrazino-6-methyl-5-propylpyrimidine (2.1 g.) was added in small amounts with shaking as the reaction was exothermic. The reaction mixture was allowed to stand for 30 minutes whereafter the resultant solid was filtered off, washed with water and recrystallized from ethanol to yield 2-dimethylamino-6-methyl-4-phenylsulphonylhydrazino-5-propylpyrimidine (Compound No. 27 of TAble I).

EXAMPLE 7

5-butyl-2-dimethylamino-4-hydrazino-6-methylpyrimidine (2.2 g.), triethylamine (1 g.) and benzoyl chloride (1.4 g.) were mixed together and stirred for 1 hour in benzene (50 mls.). A little water was then added, the benzene layer allowed to separate, removed and dried over $Na_2SO_4$, filtered and the benzene removed by distillation to yield a residue which was recrystallized from aqueous ethanol to yield 4(2-benzoyl-hydrazino)-5-butyl-2-dimethylamino-6-methylpyrimidine (Compound No. 28 of Table I). Compound Nos. 29–32 and 40 of Table I were prepared by a similar method using the appropriate reactants.

EXAMPLE 8

5-Butyl-2-dimethylamino-4-hydrazino-6-methylpyrimidine (2.2 g.), diethylchlorophosphate (2.3 g.) and triethylamine (1 g.) were heated under reflux together for 4 hours in benzene (25 mls.). The reaction mixture was then cooled, water and more benzene added, well shaken, and the benzene layer separated off and dried over magnesium sulphate and filtered. The benzene was then removed by distillation and the oily solid triturated with petroleum ether (40°–60°) and filtered off to yield diethyl -2(5-butyl-2-dimethylamino-4-methyl-6-pyrimidinyl)hydrazinophosphate (Compound No. 33 of Table I).

EXAMPLE 9

5-Butyl-2-dimethylamino-4-hydrazino-6-methylpyrimidine ((2.2 g.) and diethyl acetylphosphonate (1.8 g.) were heated under reflux together in glacial acetic acid (20 mls.) for 1** hours. The reaction mixture was poured into ice-water (100 mls.), neutralized with aqueous ammonia and extracted with methylene dichloride. The extract was then dried over magnesium sulphate, filtered and the methylene dichloride removed by distillation leaving the product (Compound No. 34 of Table I), as an oil.

EXAMPLE 10

5-n-butyl-2-dimethylamino-4-hydroxylamino-6-methyl pyrimidine (200 mg.) was dissolved in absolute ethanol (50 ml) and hydrogenated at room temperature and pressure for 8 hours in the presence of 10 percent palladium on charcoal catalyst (30 mg). The catalyst was removed by filtration and the filtrate evaporated to dryness in vacuo to give 4-amino-5-n-butyl-2-dimethylamino -6-methylpyrimidine (Compound No. 45 of Table II). Yield 160 mg. The crude material was recrystallized from 40/60 boiling range petroleum ether to give colorless crystals m.p. 58°–59° C.

The compounds of the invention possess activity against a wide variety of fungal diseases including, for example, the following specific diseases:

*Puccinia recondita* (rust) on wheat
*Phytophthora infestans* (late blight) on tomatoes
*Sphaerotheca fuliginea* (powdery mildew) on cucumber
*Erysiphe graminis* (powdery mildew) on wheat and barley
*Podosphaera leucotricha* (powdery mildew) on apple
*Uncinula necator* (powdery mildew) on vine
*Piricularia cryzae* (blast) on rice
*Plasmopara viticola* (downy mildew on vine)
*Venturia inaequalis* (scab) on apple Certain of the invention compounds also display insecticidal activity.

Accordingly, the present invention further provides pesticidal compositions comprising as an active ingredient a pyrimidine compound as hereinbefore set forth.

More particularly, the invention provides fungicidal compositions comprising as an active ingredient a pyrimidine compound of the invention and preferably a pyrimidine compound as set forth in Tables I and II above.

The following specific compounds are particularly useful pesticidally: Compound Nos. 2,3,4,6,11,12,13,14,17 and 18 of Table I above.

A particularly useful feature of the activity of the pyrimidine derivatives listed above is their systemic effect, that is to say, their ability to move throughout a plant to reach any part thereof and to combat any insect infestation or fungal infection thereon; it is possible with their use, therefore, to produce a composition which has valuable systemic insecticidal and fungicidal activity.

In use, the pyrimidine compounds, or compositions containing them may be applied in a number of ways. Thus their application can suitably be directly onto the foliage of the plant or to infected and/or infested areas thereof; alternatively the soil surrounding the plant, or soil in which seeds or plants are to be sown or planted can be treated with the pyrimidine compounds or compositions containing them. If desired, the seeds themselves can be similarly treated.

According to a further feature of the invention, therefore, we provide a method of combating undesired fungal or insect infestations in plants which comprises applying to the locus of the plant a pyrimidine compound or a composition as hereinbefore defined.

The invention further includes a method of combating fungal or insect infestations in plants which comprises applying to a plant or to seeds thereof a pyrimidine compound or a composition as hereinbefore defined.

In yet a further aspect of the invention, therefore, we provide a method of treating agricultural soil comprising applying to the soil a pyrimidine compound or a composition as hereinbefore defined.

The compounds and compositions of the invention are useful for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, pumice, bentonite, kieselguhr, dolomite, calcium carbonate, talc, powdered magnesia, Fuller's earth, gypsum, Hewitt's earth, diatomaceous earth and China clay. Compositions for dressing seeds, for example, may comprise an agent assisting the adhesion of the composition to the seed, for example, a mineral oil, or a vegetable oil such as castor oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecyl-benzenesulphonate, sodium, calcium or ammonium lignosulphonate, butyl-naphthalene sulphate, and a mixture of the sodium salts of diisopropyl- and triisopropyl-naphthalene sulphonic acids.

Suitable agents of the non-ionic type include, for example the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethylcellulose, and the vegetable gums, for example gum acacia, gum tragacanth and bentonite.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes, trichloroethylene, methylchloroform and trimethylbenzene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain on treated surfaces, the different compositions can be better adapted for the various uses for which they are intended.

The pyrimidine derivatives may also be conveniently formulated by admixing them with fertilizers. A preferred composition of this type comprises granules of fertilizer material incorporating, for example coated with, a pyrimidine derivative. The fertilizer material may, for example, comprise nitrogen, or phosphate-containing substances.

In yet a further aspect of the invention, therefore, we provide a fertilizer comprising a pyrimidine compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85 percent by weight of the active ingredient or ingredients and generally from 25–60 percent by weight of the active ingredient or ingredients. When diluted to form aqueous preparations, such preparations may contain varying amounts of the active ingredient or ingredients depending upon the purposes for which they are to be used, but an aqueous preparation containing between $0_{0.001}$ percent and 1.0 percent by weight of active ingredient or ingredients may be used.

It is to be understood that the fungicidal compositions of this invention may comprise, in addition to a pyrimidine derivative, one or more other compounds having biological activity.

The agricultural compositions of the invention may be stabilized by the incorporation therein of stabilizing agents, for example epoxides, for example epichlorohydrin.

The following examples are illustrative of the compositions according to the invention.

EXAMPLE 11

This example illustrates a concentrate comprising a miscible oil which is readily convertible by dilution with water into a liquid preparation suitable for spraying purposes. The concentrate has the following composition:

| | % wt. |
|---|---|
| Compound No. 2 of Table I | 25.0 |
| 'LUBROL' L a condensate of 1 mole of | 2.5 |
| nonylphenol with 13 molar proportions of ethylene oxide. 'Lubrol' is a Trade Mark) | 2.5 |
| Calcium dodecylbenzenesulphonate | 2.5 |
| 'AROMASOL' H (a solvent mixture of alkylbenzenes | 70.0 |
| 'Aromasol' is a Trade Mark) | |
| Total: | 100.0 |

EXAMPLE 12

This example also illustrates a concentrate which is in the form of a miscible oil. The composition of this concentrate is as follows:

| | % wt. |
|---|---|
| Compound No. 2 of Table I | 25.0 |
| 'LUBROL' L ('Lubrol' is a Trade Mark) | 4.0 |
| Calcium dodecylbenzene sulphonate | 6.0 |
| 'AROMASOL' H ('Aromasol' is a Trade Mark) | 65.0 |
| Total: | 100.0 |

EXAMPLE 13

This example illustrates a wettable powder having the following composition:

| | % wt. |
|---|---|
| Compound No. 2 of Table I | 25.0 |
| Sodium silicate | 5.0 |
| Calcium lignosulphonate | 5.0 |
| China clay | 65.0 |
| Total : | 100.0 |

EXAMPLE 14

This example illustrates an atomizable fluid comprising a mixture consisting of 25 percent by weight of compound No. 2 of Table I and 75 percent by weight of xylene.

EXAMPLE 15

This example illustrates a dusting powder which may be applied directly to plants or other surfaces and comprises 1 percent by weight of compound No. 2 of Table I and 99 percent by weight of talc.

EXAMPLE 16

25 Parts by weight of the product described in Example 3, 65 parts by weight of xylene, and 10 parts of an alkyl aryl polyether alcohol ("Triton" X-100; "Triton" is a Trade Mark used to describe octyl phenoxy polyethoxy ethanol) were mixed in a suitable mixer. There was thus obtained an emulsion concentrate which can be mixed with water to produce an emulsion suitable for spraying domestic animals for treatment of parasitic infestations, and suitable for use in agricultural applications.

EXAMPLE 17

5 Parts by weight of the product described in Example 3 were thoroughly mixed in a suitable mixer with 95 parts by weight of talc. There was thus obtained a dusting powder suitable for the treatment of parasitic infestations of domestic animals.

EXAMPLE 18

10 Parts by weight of the product described in Example 3, 10 parts of a condensate of nonylphenol and ethylene oxide ('-'Lissapol" NX; "Lissapol" is a Trade Mark) and 80 parts by weight of diacetone alcohol were thoroughly mixed. There was thus obtained a concentrate which, on mixing with water, gave an aqueous dispersion suitable for application as a spray in the control of insect pests.

EXAMPLE 19

This example illustrates a concentrated liquid formulation in the form of an emulsion. The ingredients listed below were mixed together in the stated proportions and the whole stirred until the constituents were dispersed.

|  | % wt. |
|---|---|
| Compound No. 2 (Table I) | 20% |
| 'LUBROL' L (Lubrol is a Trade Mark) | -&% |
| Calcium dodecylbenzensulphonate | 3% |
| Ethylene dichloride | 45% |
| 'AROMASOL' H (Aromasol is a Trade Mark) | 15% |
| Total: | 100% |

EXAMPLE 20

The ingredients listed below were ground together in the proportions stated to produce a powdered mixture readily dispersible in liquids.

|  | % wt. |
|---|---|
| Compound No. 2 (Table I) | 50% |
| Dispersol T (for the disodium salt of methylene . . . . . naphtha . . . sulphonic acid) | 5% |
| "Dispersol" is a Trade Mark) | |
| China Clay | 45% |
| Total: | 100% |

EXAMPLE 21

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | % wt. |
|---|---|
| Compound No. 2 (Table I) | 50% |
| Dispersol T | 12.5% |
| Calcium lignosulphonate | 5% |
| Sodium dodecylbenzenesulphonate | 12.5% |
| Sodium acetate | 20% |
| Total: | 100% |

EXAMPLE 22

A composition suitable for use as a seed dressing was prepared by mixing all three of the ingredients set out below in the proportions stated.

|  | % wt. |
|---|---|
| Compound No. 2 (Table I) | 80% |
| Mineral Oil | 2% |
| China Clay | 18% |
| Total: | 100% |

EXAMPLE 23

A granular composition was prepared by dissolving the active ingredient in a solvent, spraying the solution obtained onto the granules of pumice and allowing the solvent to evaporate.

|  | % wt. |
|---|---|
| Compound No. 2 (Table I) | 5% |
| Pumice Granules | 95% |
| Total: | 100% |

EXAMPLE 24

An aqueous dispersion formulation was prepared by mixing and grinding the ingredients recited below in the proportions stated.

|  | %wt. |
|---|---|
| Compound No. 2 ((Table I) | 40% |
| Calcium lignosulphonate | 10% |
| Water | 50% |
| Total: | 100% |

Compositions according to the invention were made up in the following manner and tested against various fungal diseases, and the results of these tests are shown in Table III hereinafter. In the tests, both a protectant and an eradicant test were carried out and in the protectant test, and plants were either sprayed so that the leaves were wetted, or the surrounding soil drenched with a solution or suspension containing 500 parts per million of the active compound and 0.1 percent of a wetting agent. The protectant test was also carried out by treating the soil surrounding the plants with a solid composition containing the active compound. After 24 hours the plants were inoculated with the disease, the extent of which was assessed visually at the end of the test. In the eradicant test, the plants were inoculated with the disease and then, after a number of days depending on the disease, the leaves were wetted by spraying with a solution or suspension containing 500 parts per million of the active compound and 0.1 percent of a wetting agent. The results are shown in Table III below as a grading giving the percentage amount of disease as follows:

| Grading | Percentage Amount of Disease |
|---|---|
| 0 | 61 to 100 |
| 1 | 26 to 60 |
| 2 | 6 to 25 |
| 3 | 0 to 5 |

TABLE III

| Compound Number | Puccinia Recondita Wheat 10 | | Phytophthora Infestans Tomato 4 | | Sphaerotheca Fuliginea Cucumber 10 | | Erysiphe graminis Wheat 10 | | Erysiphe graminis Barley 10 | | Podosphaera leucotricha Apple 10-14 | | Uncinula necator Vine 14 | | Plasmopara viticola Vine 14 | | Piricularia oryzae Rice 7 | | Venturia inaequalis Apple 14 | |
|---|---|---|---|---|---|---|---|---|---|---|---|---|---|---|---|---|---|---|---|---|
| | Prot | Erad | Prot | Erad | Prot | Erad | Prot | Erad | Prot | Erad | Prot | Erad | Prot | Erad | Prot | Erad | Prot | Erad | Prot | Erad |
| 1 | 0 | 0 | 0 | | 0 | 1 | | | | | | | | | | | | | | |
| 2 | 0 | 0 | 1 | | 3 | 3 | 3 | | 3 | | 3 | | 2 | | 3 | | 2 | | 3 | |
| 3 | 0 | 0 | 0 | | 3 | 3 | 3 | | 2 | | 2 | | 0 | | 3 | | 1 | | 2 | |
| 4 | 0 | 0 | 0 | | 3 | 3 | 2 | | 2 | | 2 | | 2 | | 3 | | 2 | | 2 | |
| 5 | 0 | 0 | 0 | | 3 | 3 | 1 | | 0 | | | | 0 | | 0 | | 1 | | 0 | |
| 6 | 0 | 0 | | | 3 | 3 | 3 | | 3 | | | | | | 1 | | 0 | | | |
| 7 | 0 | 0 | | | 3 | 3 | 3 | | 3 | | | | | | 3 | | 2 | | 2 | |
| 8 | 0 | 0 | | | 2 | 2 | 0 | | 0 | | | | | | 3 | | | | | |
| 9 | | | | | 0 | 1 | | | | | | | | | | | | | | |
| 10 | 0 | 0 | 1-2 | | 3 | 3 | 0 | | 0 | | 3 | 1 | 3 | | 2 | | 0 | | 2 | |
| 11 | 1 | 0 | 1 | | 0 | 2 | 3 | | 3 | | 1 | | 1 | | 3 | | 3 | | 3 | |
| 12 | 1 | 0 | 1 | | 3 | 3 | 3 | | 1 | | 3 | | 0 | | 3 | | 3 | | 2 | |
| 13 | 1 | 0 | 2 | | 3 | 3 | 0 | | 3 | | 2 | | 0 | | 0 | | 1 | | 1 | |
| 14 | 1 | 0 | 3 | | 3 | 3 | 3 | | 3 | | 2 | | 0 | | 1 | | 3 | | 0 | |
| 15 | 0 | 0 | 3 | | 3 | 2 | 3 | | 3 | | 1 | | 0 | | 3 | | 0 | | 0 | |
| 16 | 0 | 0 | 1 | | 3 | 3 | 0 | | 0 | | 2 | | 0 | | 0 | | 3 | | 0 | |
| 17 | 0 | 0 | 3 | | 2 | 2 | 3 | | 3 | | 0 | | 0 | | 2 | | 3 | | 0 | |
| 18 | 0 | 0 | 1 | | 3 | 3 | 0 | | 0 | | 2 | | 0 | | 0 | | 1 | | 2 | |
| 19 | 0 | 0 | 3 | | 3 | 3 | 3 | | 3 | | 2 | | 1 | | 3 | | 3 | | 2 | |
| 20 | 0 | 0 | 0 | | 3 | 1 | 0 | | 2 | | 3 | | | | 2 | | 1 | | 3 | |
| 21 | 1 | 0 | 0 | | 2 | 1 | 0 | | 0 | | 0 | | 0 | | 2 | | 0 | | 3 | |
| 22 | 1 | 0 | 0 | | 2 | 0 | 0 | | 0 | | 0 | | | | 2 | | 0 | | 2 | |
| 23 | 0 | 0 | 1 | | 3 | 3 | 3 | | 3 | | 2 | | | | 3 | | 1 | | 2 | |
| 24 | 1 | 0 | 0 | | 2 | 0 | 2 | | 0 | | 0 | | 0 | | 0 | | 0 | | 2 | |
| 25 | 0 | 0 | 2 | | 1 | 1 | 2 | | 1 | | 1 | | | | 2 | | 3 | | 1 | |
| 26 | 0 | 0 | 1 | | 3 | 1 | 0 | | 3 | | 1 | | | | 0 | | 0 | | 0 | |
| 27 | 0 | 0 | 3 | | 3 | 3 | 0 | | 3 | | 2 | | 0 | | 3 | | 1 | | 1 | |
| 28 | 0 | 0 | 3 | | 3 | 3 | 3 | | 3 | | 2 | | 0 | | | | 0 | | | |
| 29 | 0 | 0 | 3 | | 3 | 3 | | | | | | | 1 | | | | | | 3 | |
| 30 | 0 | 0 | 2 | | 3 | 1 | 3 | | 3 | | 2 | | | | | | | | | |
| 31 | 0 | 0 | 2 | | 3 | 2 | 0 | | 0 | | 2 | | | | 1 | | 0 | | 3 | |
| 32 | 0 | 0 | 1 | | 3 | 2 | 0 | | 1 | | 3 | | 0 | | 3 | | 1 | | 3 | |
| 33 | 0 | 0 | 0 | | 3 | 3 | 2 | | 1 | | 2 | | 0 | | 2 | | 1 | | 3 | |
| 34 | 0 | 0 | 0 | | 3 | 2 | 0 | | 0 | | 1 | | | | 1 | | 0 | | 0 | |
| 35 | 0 | 0 | 0 | | 3 | 2 | 3 | | 3 | | 0 | | 0 | | 2 | | 0 | | | |
| 36 | 0 | 0 | 1 | | 3 | 2 | 3 | | 3 | | 3 | | | | | | | | | |
| 37 | 0 | 0 | 3 | | 3 | 3 | 2 | | 2 | | | | | | | | 2 | | | |
| 38 | 0 | 0 | 2 | | 3 | 2 | 3 | | 3 | | 1 | | 0 | | 2 | | 0 | | 0 | |
| 39 | 0 | 0 | 1 | | 3 | 0 | 3 | | 3 | | 3 | | 0 | | 2 | | 0 | | 1 | |
| 40 | 0 | 0 | 0 | | 3 | 0 | 0 | | 0 | | 1 | | 0 | | 2 | | 2 | | 0 | |
| 41 | 0 | 0 | 1 | | 0 | 2 | 0 | | 0 | | 0 | | 0 | | 2 | | 0 | | 0 | |
| 42 | 0 | 0 | 0 | | 0 | 0 | 0 | | 2 | | 0 | | 1 | | 0 | | 0 | | 0 | |
| 43 | 1 | 0 | 0 | | 0 | 0 | 0 | | 2 | | 0 | | | | 0 | | 0 | | 0 | |

What we claim is:
1. A fungicidal and insecticidal composition comprising as active ingredient a fungicidally and insecticidally effective amount of a pyrimidine derivative of the formula:

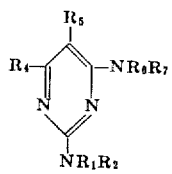

wherein:
$R_1$ and $R_2$ are hydrogen, methyl, ethyl or propyl;
$R_4$ and $R_5$ are hydrogen, alkyl of one to six carbon atoms or allyl;
$R_6$ is hydrogen; and $R_7$ is (i) hydrogen, hydroxy, amino, methylphenyl or (ii) a group —N = $CR_N$—$R_9$ wherein $R_N$ is hydrogen or methyl and $R_9$ is phenyl, chlorophenyl, methylphenyl, hydroxyphenyl,

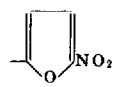

dichlorophenyl, methoxyphenyl,

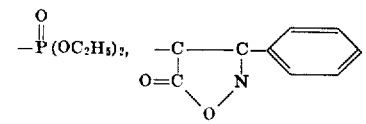

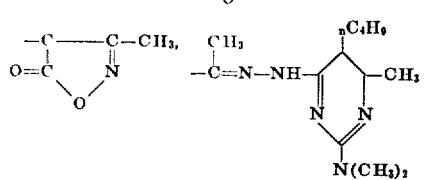

or $CH_2CH_2CH_3$; or (iii) a group —NH—$R_{10}$ wherein $R_{10}$ is

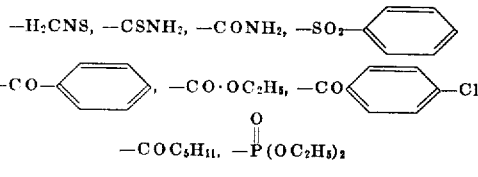

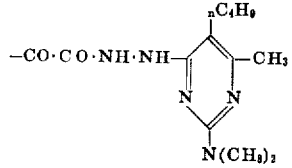

or

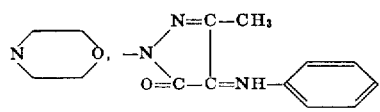

or wherein $R_6$ and $R_7$, together with the N atom of —$NR_6R_7$, form the group:

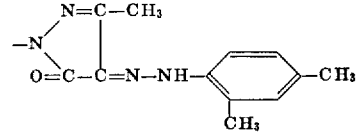

and a major proportion of a carrier for said active ingredient.
2. The composition of claim 1 including a wetting agent.
3. The composition of claim 1 comprising from 0.001 percent to 85 percent by weight of the active ingredient.
4. The composition of claim 3 comprising from 10 percent to 85 percent by weight of the active ingredient.
5. The composition of claim 3 comprising from 0.001 percent to 1.0 percent by weight of the active ingredient.

6. A method of combating undesired fungal and insect infestations in plants which comprises applying to the plants, seeds or soil therefor, a fungicidally and insecticidally effective amount of a pyrimidine derivative of the formula:

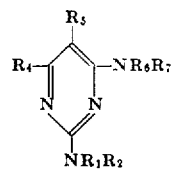

wherein:
$R_1$ and $R_2$ are hydrogen, methyl, ethyl or propyl;
$R_4$ and $R_5$ are hydrogen, alkyl of one to six carbon atoms or allyl;
$R_6$ is hydrogen; and $R_7$ is (i) hydrogen, hydroxy, amino, methylphenyl or (ii) a group —N = $CR_N$—$R_9$ wherein $R_N$ is hydrogen or methyl and $R_9$ is phenyl, chlorophenyl, methylphenyl, hydroxyphenyl,

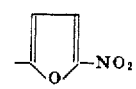

dichlorophenyl, methoxyphenyl,

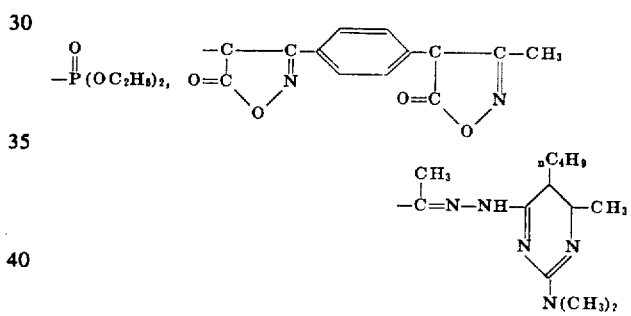

or $CH_2CH_2CH_3$; or (iii) a group —NH—$R_{10}$ wherein $R_{10}$ is

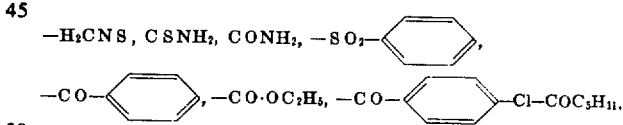

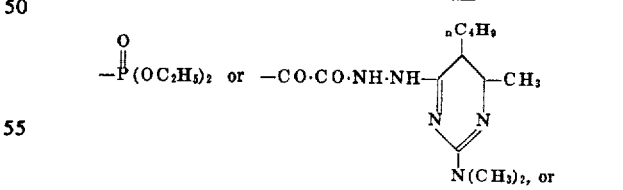

, or wherein $R_6$ and $R_7$, together with the N atom of —$NR_6R_7$, form the group:

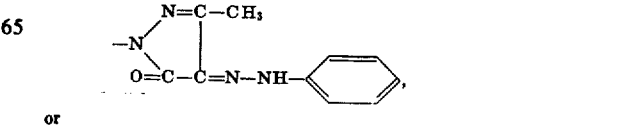

or

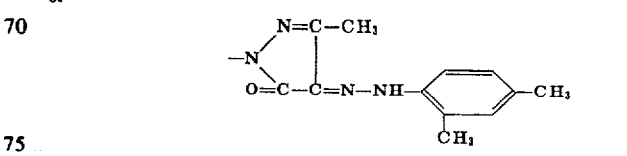

* * * * *